Sept. 25, 1928.
G. H. DAWSON ET AL
1,685,353
TRUSSED STRUCTURE
Original Filed Nov. 26, 1924
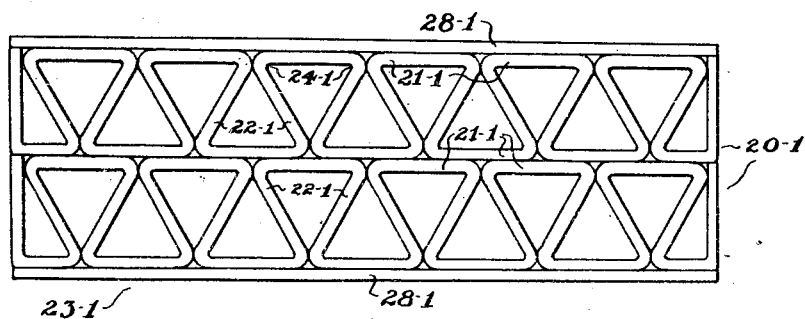
Inventors
George Hives Dawson
Hurxthal Field Frease
By Frease and Bond
Attorneys Patented Sept. 25, 1928.

1,685,353

UNITED STATES PATENT OFFICE.

GEORGE HIVES DAWSON, OF BOSTON, MASSACHUSETTS, AND HURXTHAL FIELD FREASE, OF CANTON, OHIO.

TRUSSED STRUCTURE.

Original application filed November 26, 1924, Serial No. 676,897. Divided and this application filed December 13, 1924. Serial No. 755,616.

The invention relates to trussed structures having spaced chord members and connecting web members joined together; and this application is a division of our prior application for patent for trussed structures, filed November 26, 1924, Serial No. 676,897.

Ordinarily the chord and web members of a trussed structure are separate pieces which must be made to size and assembled to form the completed structure. In the manufacture of even a simple trussed girder of substantial length, while the equivalent of a large number of chord members is attained by the use of two or more strips of the total length of the girder, yet there are still a large number of separate web members each of which must be made and punched to size and each of which must be properly assembled and fastened usually by means of rivets to the continuous equivalents of a large number of chord members. In the manufacture of such a girder the number of separate members each of which must be made to size and assembled often runs to several hundred. Due to the fact that most of these members must be fastened at each end to the co-operating members in the structure or the equivalents thereof, the number of chances for manufacturing and assembling errors, for two ended members, is double the number of members or equivalents to be assembled. Moreover in such an assembled trussed structure unequal strains and stresses are often set up in individual members due to the fact that it has been found to be a practical imposibility accurately to space and secure the fastening means which tie the truss members together at the joints.

The objects of the present invention are to economize the manufacture of trussed structures and to overcome unequal strains and stresses due to erection inaccuracies, by reducing the number of parts to be made and assembled; and these objects are attained by the use of—

A plurality of superposed trussed elements joined together, each of the elements being formed from a continuous strip and including spaced rows of chord members and connecting web members, there being junction angles between the chord and web members, and means fastening the chord and web members to each other at the junction angles.

The invention is illustrated in the accompanying drawing forming part hereof, in which—

The figure is a view which may be either an elevation or a plan view of a trussed structure including a plurality of superposed trussed elements each made from a continuous strip of material.

Similar numerals refer to similar parts throughout the drawing.

While the continuous material used to form the trussed elements of the present invention may be of any desired substance; for most practical purposes a continuous metallic material adapts itself easily to the necessary forming operations, and to assembly by the use of any desired fastening means such as riveting, welding, or mecahnical means.

Moreover the continuous material may be solid as shown, or may be perforated, or made of expanded metal, or may have any other desired conformation.

A trussed structure 23—1 includes a plurality of superposed and abutting trussed elements 20—1 and flange reinforcing strips 28—1, each element being made from a continuous strip and including chord members 21—1, web members 22—1, and junction angles 24—1 between the chord and web members.

The elements may be joined together and to each other by any desired fastening means such as spot welding, not shown.

The junction angles of the elements abut each other as illustrated, and a preferred method of assembling the superposed and abutting elements of the structure, as illustrated, includes spacing the junction angles of one element between the junction angles of the abutting and superposed element.

The elements may have any desired depth perpendicular to the truss plane, that is, the plane of the drawing, and more than two elements may be thus assembled according to the invention for the purpose of making gratings and the like.

We claim:

1. A trussed structure including a plurality of trussed elements, each of the elements being formed from a continuous strip and including spaced inner and outer rows of longitudinally extending members and transversely extending connecting members, there being junction angles between the longitudinally extending members and the transversely extending members, and the members of each element being joined to each other at the junction angles for resisting both tension and compression, and inner longitudinally extending members of the elements abutting each other, and means bodily fastening the abutting members to each other.

2. A trussed structure including a plurality of trussed elements, each of the elements being formed from a continuous strip and including spaced inner and outer rows of longitudinally extending members and transversely extending connecting members, there being junction angles between the longitudinally extending members and the transversely extending members, and the members of each element being joined to each other at the junction angles for resisting both tension and compression, and inner longitudinally extending members of the elements abutting each other and the junction angles of one element being spaced between the angles of the abutting element, and means bodily fastening the abutting members to each other.

In testimony that we claim the above, we have hereunto subscribed our names.

GEORGE HIVES DAWSON.
HURXTHAL FIELD FREASE.